Patented Sept. 19, 1944

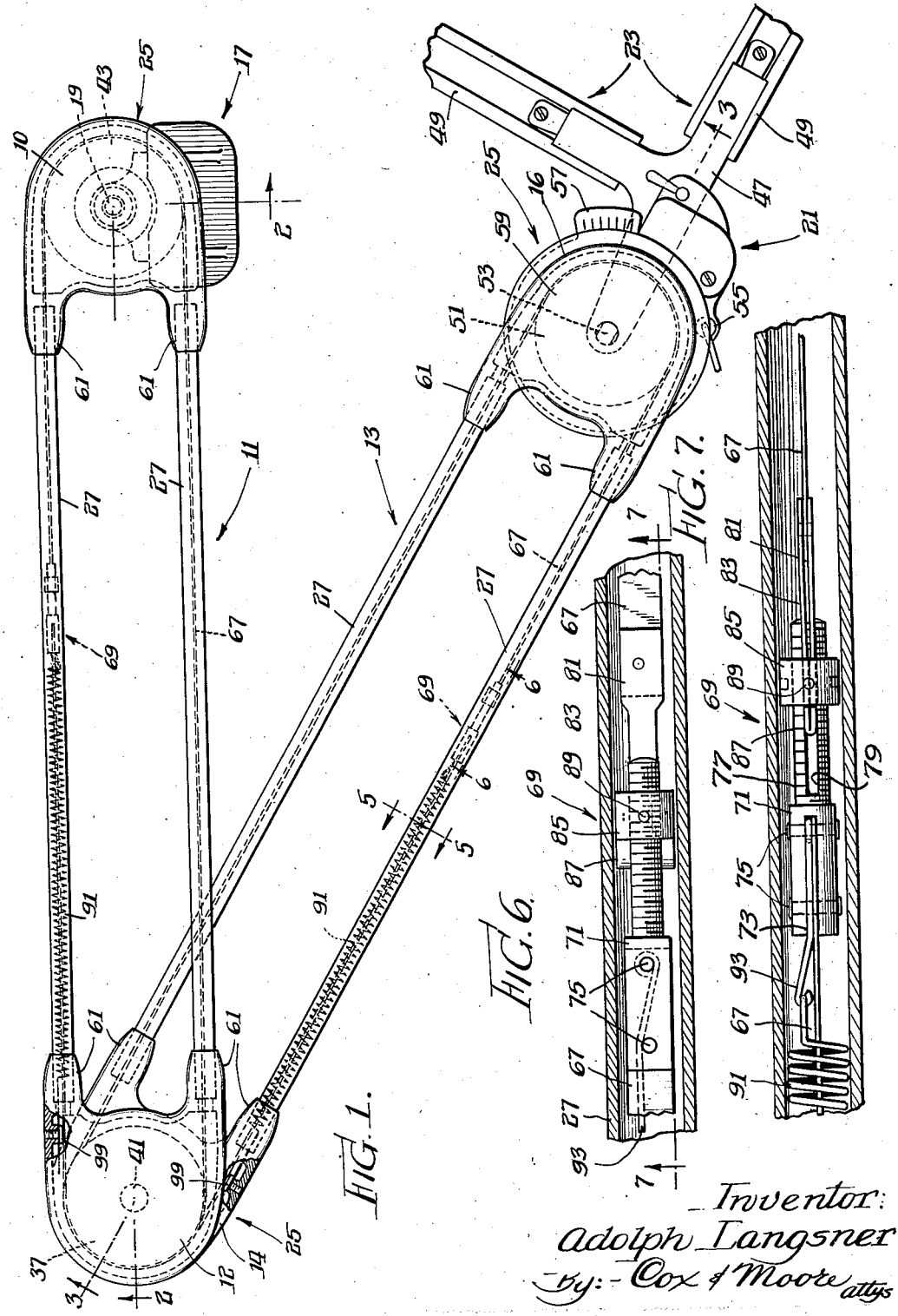

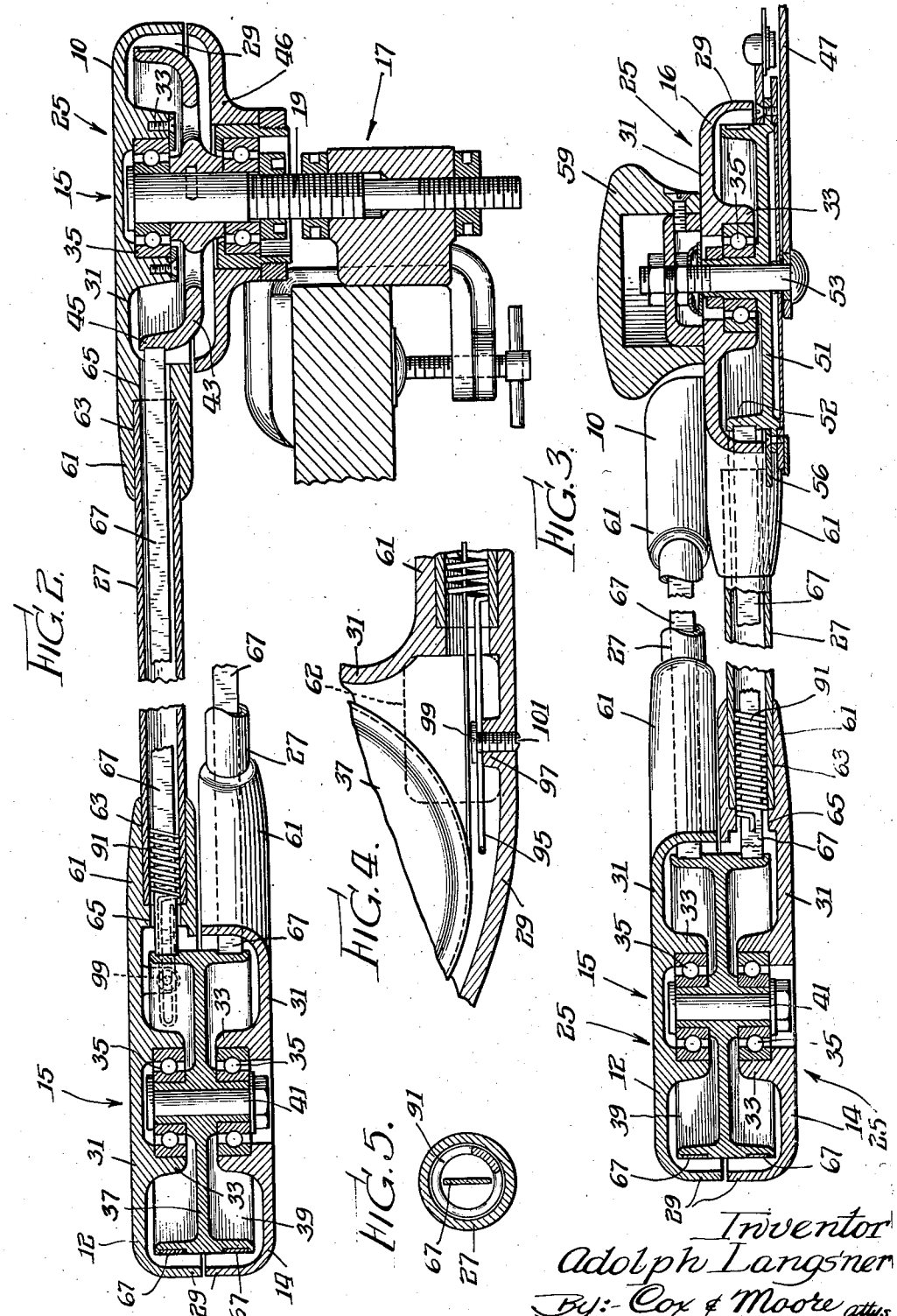

2,358,521

UNITED STATES PATENT OFFICE 2,358,521

DRAFTING APPARATUS

Adolph Langsner, Chicago, Ill., assignor to Eugene Dietzgen Co., Chicago, Ill., a corporation of Delaware Application December 15, 1937, Serial No. 179,832

3 Claims. (Cl. 33—79)

My invention relates in general to parallel motion devices and more especially to drafting equipment embodying parallel motion mechanism, the invention relating more particularly to a device adapted for attachment on a drawing board or table in order to support a ruling guide element, such as a straight edge, for free and unrestricted movement within a drafting area on the board or table, while maintaining the ruling element in an adjusted relative angular relation with respect to the board or table throughout the movement of the guide element within said drafting area.

An important object of the invention is to provide parallel motion apparatus in which the element supported for parallel movement is carried on a jointed arm, including flexible, endless belt means for maintaining the supported device in a desired alignment, regardless of the movement of the arm.

Another important object of the invention is to provide improved parallel motion apparatus comprising a pair of arms connected together for relative angular movement and adapted, one for attachment on a supporting base and the other to carry the device supported for parallel movement, the arms embodying flexible driving elements operating on pulleys at the opposite ends of the arms in order to maintain parallel movement of the ruling guide.

Another important object resides in providing apparatus of the character mentioned wherein the relatively movable arms are of simplified construction, each comprising tubular connecting means extending between pulley housings and supporting the housings in spaced relationship whereby an inexpensive, lightweight, and adequately rigid arm construction is provided; a further object being to utilize the tubular means for the purpose of housing and protecting the flexible driving element, while at the same time holding the pulley housings in spaced relationship.

Another important object resides in utilizing a flexible driving element on each arm for drivingly connecting the pulleys at the opposite ends of the arms; a further object being to provide improved means for connecting the opposite ends of the driving element in a manner permitting adjustment of the tension thereof when in place on the pulleys.

Another important object resides in providing a novel pulley housing construction to facilitate the insertion or application of the flexible driving element on the enclosed pulleys with the element extending between said pulleys through the tubular rods.

Another important object is to provide yielding means neatly and compactly arranged to normally urge the flexible driving element in one direction on said pulleys; a further object being to utilize a helical spring extending within one of the tubular spacing and enclosing members, with the flexible driving element extending axially through said helical spring, whereby to conserve space and permit the spring and driving element to be snugly enclosed while freely operable within the tubular element.

Another important object is to simplify the operation of assembling parts forming a parallel motion mechanism of the character mentioned.

Among the numerous other objects and advantages of my present invention is the provision of neat, compact and attractive parallel motion mechanism wherein the weight of moving parts is reduced to a minimum, all of the parts being entirely enclosed and housed against mechanical damage from outside forces and from deterioration through exposure to the atmosphere, the novel structural features of the apparatus, in addition, lending themselves to the provision of an attractive streamlined appearance in the finished article.

The foregoing and numerous other objects, advantages and inherent functions of my present invention will become apparent as the same is more fully understood from the following description which, taken in connection with the accompanying drawings, discloses a preferred embodiment of the invention.

Referring to the drawings,

Figure 1 is a top plan view of parallel motion mechanism embodying my present invention, parts of the apparatus being broken away to illustrate the internal construction;

Figures 2 and 3 are sectional views taken substantially along the lines 2—2 and 3—3, respectively, in Figure 1;

Figure 4 is an enlarged view of a portion of the device shown in Figure 1; and

Figures 5, 6 and 7 are sectional views, respectively, taken substantially along lines 5—5 and 6—6 in Figure 1 and along line 7—7 in Figure 6.

To illustrate my invention, I have shown on the drawings parallel motion mechanism comprising means forming a pair of arm elements 11 and 13 connected together for relative rotation about an axis 15 adjacent an end of each arm, means 17 being provided at the opposite end of the arm 11 for anchoring it on a drafting board or table for relative rotation about a stationary axis preferably formed by a stationary pin 19. The end of arm 13, opposite from the pivot 15, carries means 21 for supporting an element 23 for parallel movement, said element, in the illustrated embodiment, comprising drafting guide means adapted to be moved throughout a drafting area on the drawing board or table on which the mechanism is or may be attached.

The arms 11 and 13 are preferably of substantially identical construction and may comprise each a pair of housing elements 25 and a pair of hollow, tubular spacers 27, the opposite ends of which are secured to the housing elements 25 to support the same in spaced-apart relationship. The housing elements of the arm 11 are individually identified by the numerals 10 and 12, while the corresponding elements of the arm 13 are identified by the numerals 14 and 16.

The housing elements 25 preferably are of substantially identical construction for convenient and inexpensive fabrication, and they preferably comprise, generally, shallow, cylindrical casings, each having a cylindrical rim 29 and a closed end wall 31, the opposite end being open. The end wall 31, concentrically within the rim 29, carries an annular flange 33 preferably formed integral with the wall 31 and extending inwardly of said wall in position to form a seat for a bearing 35 of any suitable or preferred construction, and which, as shown on the drawings, may be a roller or ball bearing.

The casings 10 and 12, which are at the opposite ends of the arm 11, as well as the casing 16, which is at the free end of the arm 13, are arranged with their open ends facing downwardly toward the surface on which the device is mounted. The casing 14 at the end of the arm 13, which is secured to the arm 11, is arranged with its open end facing upwardly, opposite the open end of the casing 12, so that the casings 12 and 14 cooperate to form a housing. This housing encloses a pulley 37 having a rim 39 extending in the peripheral portions of the compartment formed by the cooperating casings 12 and 14. The pulley is mounted on a pin 41 and journalled for rotation in the bearings 35 of the casings 12 and 14, the pin 41 serving to hold the casings together by cooperation with said bearings. It will be noted that the pin 41 has a nut threaded thereon at one end and that the end wall 31 of the casing 14 is formed with a central opening through which access may be had to said nut.

At the anchored end of the arm 11 the arm is preferably pivotally mounted upon a shaft or pin 19, said shaft being preferably fixed on and forming a part of the means 17 by which the device is or may be fastened upon the drawing board or table. The housing element 10 is journalled on the pin 19 by means of its bearing 35. The pin 19 also carries a pulley 43 extending within the housing element 10 and having a rim 45 extending adjacent and within the rim 29 of the casing. The pulley 43 has a hub fixed on the pin or shaft 19 so that the pulley is held from rotation with respect to the mounting means 19 and the table on which the device is or may be attached.

The open end of the housing 25 may be and preferably is enclosed by suitable cover means 46 supported on the shaft 19, and while such cover means may take any suitable or convenient form and may be formed on or carried by the pulley 43, if desired, I prefer to mount the cover for free rotational movement on the pin 19 so that the casing 10 and cover 46 may form a closed casing around the pulley 43.

In the illustrated embodiment the device or element 23 supported for parallel movement comprises a bracket 47 supporting straight edge elements 49 at right-angles, one with respect to the other, although it is, of course, apparent that the invention is not necessarily limited to the specific character of the supported element 23. Means 21 is provided to mount the supported element 23 upon the casing 16 at the free or swinging end of the arm 13, the means 21 comprising a pulley 51 carried on a pin 53 and journalled for rotation on the housing element 16 by means of the bearing 35 in said housing.

It will be noted that the pin 53 is fast with the pulley 51, the pin having a head extending downwardly of and projecting from the lower, open end of the housing in position to support the bracket 47 which forms a part of the supported element 23. The bracket 47 is carried by the pin 53, and means, including the clamp 55, is provided for adjusting the relative angular relationship of the supported device 23 with respect to the pulley 51 and for locking the parts in a desired adjusted relationship, the angularity of which may be determined on a scale 57 carried by the pulley 51. At its end opposite the head the pin 53 projects upwardly of the bearing through a central opening formed in the wall 31 of the housing 16, and this end is provided with means for attaching a knob or hand piece 59 to aid in the manipulation of the device. In the illustrated embodiment the hand piece 59 is fastened on the pin 53 against turning movement.

The rim 29 of each of the casings 10, 12, 14 and 16 is or may be formed with a pair of preferably integral projections 61 extending tangentially of the rim 29, said projections on each casing being parallel and spaced apart on opposite sides of the casing. The projections 61 are each formed with a preferably accurately defined seat 63 adapted to snugly receive the end of a spacer tube 27. The bottom of each seat is connected with the interior of the casing on which it is formed, by means of an opening 65 so that when the end of a tube 27 is assembled in the seat 63 the interior of the tube is connected with the interior of the casing in tangential alignment with the rim of the pulley therein.

The arms 11 and 13 are assembled readily by press-fitting the ends of the tubular members 27 into the sockets or seats 65, the tubes forming adequately rigid connection between the casings and serving to maintain the casings in accurately spaced apart relationship, at the same time providing an extremely lightweight arm structure.

It will be noted that the casings 12 and 14 cooperate to form a substantially closed housing for the pulley 37; that the housing 10, in conjunction with the cover means 46, likewise forms a substantial enclosure for the pulley 43; and that the pulley 51 has a portion carrying an outstanding flange 56 that cooperates with the open end of the casing 16 to form an enclosure for the tape carrying portions of the pulley 51.

The rims of the pulleys 43 and 51 are each formed preferably with a single, peripheral groove, while the pulley 37 at the pivotally connected ends of the arms 11 and 13 is formed with a pair of grooves in its rim. The grooves in all of the pulleys 37, 43 and 51, however, are of like width and depth, and are adapted to receive flexible driving means 67 preferably comprising an endless belt in each of the arms 11 and 13. These belts may conveniently comprise lengths of metal tape, the opposite ends of each tape being connected together by fastening means 69 allowing for adjustment so that the flexible driving means may be drawn up to a desired tension on the carrying pulleys.

The tape-like elements forming the flexible driving means may be applied on the pulleys in each arm by threading the same endwise through the open side of the housing element 10, in the case of arm 11, and through the open side of the housing element 16, in the case of the arm 13, before the pulleys 43 and 51 are assembled in place. The tape is passed through one of the tubes 27 toward and around the pulley 37. The flexible elements of both arms 11 and 13 may thus be drawn around the pulley 39 and returned, one through the remaining tube of the arm 11, and the other through the remaining tube of the arm 13, back to the starting point. It will be noted that the pulley chamber in each casing extends into the base portions of the projections 61, thereby providing openings accessible from the under side of the arm assembly to facilitate drawing the flexible members through the tubes 27 and around the pulleys in applying the same. In addition, openings 62 may, if desired, be formed in the top of the housings for this purpose. After the flexible driving means have thus been assembled in each of the arms 11 and 13, the abutting ends of each may be connected together by the connectors 69. Then the pulleys 43 and 51 may be assembled in place.

The connectors 69 each comprise a stem 71 having a diametral slot 73 at one end adapted to receive an end of the flexible driving member 67 which is secured in the slot 73 by rivets 75 or other suitable fastening. The stem 71 has a threaded end 77 which also is provided with a diametral slot 79. A connector piece 81 is provided for attachment in relatively permanent fashion upon the end of the flexible driving element. This piece 81 is of plate-like form and is adapted to slidingly fit the slot 79. It has a necked portion 83 of width not greater than the diameter of the threaded portion of the pin so that a nut 85 on the threaded portion 77 of the stem may encircle the necked portion 83. The connecting piece 81 has a head 87 extending outwardly of the slot on opposite sides of the stem in position to rest upon one end of the nut 85. Consequently, after the driving bands 67 have been assembled in the arms 11 and 13, as heretofore described, the abutting ends of the bands may be connected together simply by attaching one of said ends in the slot 73 and attaching the other end on the connector piece 81. This done, it is merely necessary to thread the nut 85 on the stem 71 and draw the same down until a desired tension is obtained in the driving element. The nut 85 may have radial sockets therein adapted to receive a tool to facilitate the tightening of the nut on the stem, which may be accomplished readily through the openings at the base of the projections 61.

The flexible driving belts 67 are tightened sufficiently to provide appreciable frictional grip upon the pulleys. Since the pulley 43 is held against rotation with respect to the drawing board or table, it will hold the flexible connector 67 of the arm 11 because of the frictional driving engagement between said pulley 43 and the flexible connector. As the arm 11 is swung about the pivot pin 19, however, the driving connection between the flexible connector of the arm 11 and the pulley 37 will cause said pulley to rotate in the casing 12 through an angular displacement equal at all times to the angular movement of the arm 11 about the pivot pin 19. In like fashion, the flexible connector 67 of the arm 13, through its frictional driving engagement on the pulley 37 and on the pulley 51, insures that the angular movement of the pulley 51 with respect to the housing 16 is at all times equal to the angular movement of the housing 14 with respect to the pulley 39, thereby insuring that the supported element 23 is at all times maintained in an adjusted angular relationship with respect to the board or table on which the device is mounted, regardless of the movement of the arms 11 and 13. The desired angular relationship, of course, may be adjusted by manipulating the means 21, including the clamp 55, as is well understood in parallel motion mechanism.

In order to facilitate manipulation of the device, I provide means operating to normally urge the bands 67 of the several arms in opposite directions upon the pulley 37 so that when the device is in a normal or neutral position the resilient urge exerted on the pulley 37 is substantially equal and opposite. When the device is moved from the neutral position in one direction, the resilient tensioning means in one arm will be caused to exert a greater force on the pulley 37, while the force produced by the tensioning means in the other arm will be reduced. The opposite effect is created when the device is moved from the neutral position in the other direction so that the yielding means at all times normally urges the mechanism to return to the normal or neutral position, which, of course, may be adjusted to any position within the drafting area merely by slipping the driving means on the pulleys.

An important feature of my present invention is the arrangement of the resilient tensioning means neatly and compactly within the tubular members 27. To this end, the resilient tensioning means may comprise helical springs 91, one for each of the arms 11 and 13. This helical spring preferably has an internal diameter appreciably greater than the largest cross-sectional dimension of the flexible driving element 67 so that said spring may be assembled in position encircling a portion of the driving element, without, however, binding upon the element or interfering in its operation. The spring 91 also is of a size to fit freely within one of the spacing tubes 27 without binding.

One end of the spring is attached to the stem 71 as by means of a hook 93 fastened on said stem, preferably by means of one of the pins 75 by which the end of the flexible driving element is secured to the stem. The other end of the spring has a preferably hooked portion 95 forming an elongated loop and is secured adjustably upon a boss 97 formed within the marginal flange 29 of one of the housing elements 25, and I prefer to form the spring anchoring boss 97 in the housing element 14 for the arm 13 and in the housing 12 for the arm 11, so that the anchored ends of the springs of both arms are connected on the elements 12 and 14 housing the pulley 37. It will be apparent, however, that the springs may be anchored at either end of the arms in which they are assembled.

To secure the spring on the anchoring boss, I prefer to utilize a stud 99 having an enlarged, preferably flat head adapted to overlie the looped portion 95 of the spring to hold the same clampingly upon the end of the anchoring boss 97. The stud 99 has a threaded stem extending through the boss and having an end exposed outwardly of the marginal flange 29 of the housing in which it is mounted. This exposed end may be slotted as at 101 or otherwise formed to receive a turning element, such as a screw-driver, to facilitate the tightening of the stud or loosening thereof in anchoring the spring or releasing the same for adjustment.

The device of my present invention has several advantages, including simplicity of construction of the arms 11 and 13, lightness in weight of moving parts; the provision of simple, easily operated means for tensioning the flexible driving belts 67 and the housing thereof within the spacing tubes 27, thereby effectively enclosing the same and improving the appearance of the apparatus; the provision of counterbalancing springs and the neat, compact arrangement thereof around the flexible driving belts within the spacing tubes 27; and also the simplified arrangement for adjusting the tension of the springs.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention; but I do not herein claim the broader aspects of the invention, nor the combination including the adjustable connector 69, since the same forms the subject-matter of claims in my co-pending application, Serial No. 272,335, filed May 8, 1939.

The invention is hereby claimed as follows:

1. In apparatus of the character described including a frame carrying, in spaced relationship thereon, a pair of transmission members forming supports angularly movable with respect to the frame, and flexible driving means comprising an elongated tension member on and extending between said supports and drivingly interconnecting the same, said frame providing a tubular duct between said supports for housing portions of said tension member between said supports, the combination, with said tension member and said frame, of a helical spring encircling a portion of said tension member within said duct and interconnected between said tension member and said frame to normally urge the driving means in one direction on said supports, said frame having an embossment at the end of said duct, and said spring at one end having a fastening portion adapted to overlie said embossment, a head stud threaded in said frame at said embossment to clampingly secure said fastening portion on the embossment, said stud having an exposed end to facilitate manipulation of the same in clamping or releasing the fastening portion on said embossment.

2. In a parallel motion apparatus of the character mentioned, means comprising an arm having pulleys spaced apart thereon, flexible driving means on said pulleys and provided with a spring anchorage hook, a helical spring connected at one end on said hook, said spring encircling said flexible driving means, an adjustable member connected to the other end of the said spring and adjustable shiftably on said arm to adjust the tension of said spring, and friction clamp means to secure said shiftably adjustable member in adjusted position on said arm.

3. In a parallel motion apparatus of the character mentioned, means comprising an arm having pulleys spaced apart thereon, flexible driving means on said pulleys and provided with a spring anchorage hook, a helical spring connected at one end on said hook, said spring encircling said flexible driving means, an adjustable member connected to the other end of the said spring and adjustable shiftably on said arm to adjust the tension of said springs, and a head stud on said arm operable to clamp the shiftable member in adjusted position on said arm.

ADOLPH LANGSNER.